Patented Aug. 11, 1925.

1,549,208

UNITED STATES PATENT OFFICE.

WERNER MOOSER, OF BERN-LIEBEFELD, SWITZERLAND, ASSIGNOR, BY MESNE ASSIGNMENTS, TO THE FIRM: HACO-GESELLSCHAFT A. G. BERN, OF BERNE, SWITZERLAND.

ANTISEPTIC PRODUCT AND PROCESS OF MAKING SAME.

No Drawing.  Application filed February 10, 1923. Serial No. 618,408.

*To all whom it may concern:*

Be it known that I, WERNER MOOSER, a citizen of Switzerland, residing at Bern-Liebefeld, Switzerland, have invented certain new and useful Improvements in Antiseptic Products and Processes of Making Same, of which the following is a specification.

My invention relates to the manufacture of antiseptic products which are also adapted for use as a nutriment both for human beings and animals, as a disinfectant and remedy for external and internal application.

I have found that acridine dyestuffs if combined with yeast or albuminous products, more especially such as are obtained from yeast, will result in the formation of products possessing a high therapeutic and nutritive value.

The following example will illustrate my invention:

Ninety kilograms of dry yeast (or the corresponding quantity of raw wet yeast) are mixed with 200 liters of cold water. A solution of 10 kilograms of 3.6-diamino-10-methylacridiniumchloride in 200 liters of hot water is added thereto and the mixture is brought by heating with steam or otherwise to a temperature of 90–100° centigrade during an hour or two. Stirring furthers the process of dyeing the yeast. As soon as all the colouring matter is fixed, the mass is cooled and the dyed yeast filtered or separated from the liquor by centrifuging or in any other suitable manner and thereafter dried at a low temperature, preferably in vacuo. The new compound thus obtained is a yellow-coloured powder which owns at the same time the properties of a nutritive product and of an antiseptic and a medicament.

Instead of raw yeast in its bitter condition, there can be used yeast whose bitterness has been removed, or purified yeast, or the compounds of yeast which are known under the names of nucleine or nucleinic acid or other albuminous bodies of similar properties. Instead of 3.6-diamino-10 methylacridiniumchloride, other acridine dyestuffs such as for instance 2-æthoxy-6.9 diaminoacridine, acridine yellow, etc. or the halogen-derivatives or other substitute-products may be used.

I wish it to be understood that I do not desire to be limited to the particular substances named nor to the exact proportions and operations described, for obvious modifications will readily occur to a person skilled in the art.

I claim:

1. The process of making an antiseptic and nutritive product, consisting in combining an albuminous body with an acridine derivative.

2. The process of making an antiseptic and nutritive product, consisting in combining yeast with an acridine derivative.

3. The process of making an antiseptic and nutritive product, consisting in dyeing an albuminous body with an acridine dyestuff.

4. The process of making an antiseptic and nutritive product, consisting in dyeing yeast with an acridine dyestuff.

5. The process of making an antiseptic and nutritive product, consisting in dyeing yeast with 3.6-diamino-10 methylacridiniumchloride.

6. The process of making an antiseptic and nutritive product, consisting in mixing a watery suspension of 90 parts by weight of dry yeast with a watery solution of 10 parts by weight of 3.6 diamino-10 methylacridiniumchloride, heating to about 90° centigrade, separating from the liquor and drying at low temperature.

7. As a new product, a compound of an albuminous body with an acridine derivative, such compound having a strong colour and possessing a vigorous bactericidal action and nutritive properties.

8. As a new product, the compound obtained by combining yeast with 3.6 diamino-10-methylacridiniumchloride, such compound being intensely yellow coloured and possessing a vigorous bactericidal action and superior nutritive properties.

In testimony whereof I affix my signature.

WERNER MOOSER.